United States Patent [19]
Bray

[11] 3,959,146
[45] May 25, 1976

[54] REVERSE OSMOSIS SYSTEM WITH AUTOMATIC FLUSHING

[75] Inventor: Donald T. Bray, Escondido, Calif.

[73] Assignee: Desalination Systems, Inc., Escondido, Calif.

[22] Filed: Dec. 26, 1974

[21] Appl. No.: 536,339

[52] U.S. Cl.......................... 210/257 M; 210/433 M
[51] Int. Cl.².......................................... B01D 31/00
[58] Field of Search ............. 210/23, 257, 321, 433

[56]             References Cited
             UNITED STATES PATENTS

| | | | |
|---|---|---|---|
| 3,630,378 | 12/1971 | Bauman | 210/257 |
| 3,719,593 | 3/1973 | Astil | 210/321 X |
| 3,786,924 | 1/1974 | Huffman | 210/257 |
| 3,846,295 | 11/1974 | Gibbs | 210/257 X |

*Primary Examiner*—Frank A. Spear, Jr.
*Attorney, Agent, or Firm*—Clement H. Allen

[57]             ABSTRACT

A reverse osmosis system which includes a purified water storage tank, has a by-pass pipe around the concentrate flow control of its membrane module and a normally closed valve in the by-pass pipe. The by-pass pipe valve is opened automatically when purified water is withdrawn from the purified water storage tank, thereby to flush feed water through the membrane module.

8 Claims, 5 Drawing Figures

U.S. Patent   May 25, 1976   Sheet 1 of 2   3,959,146
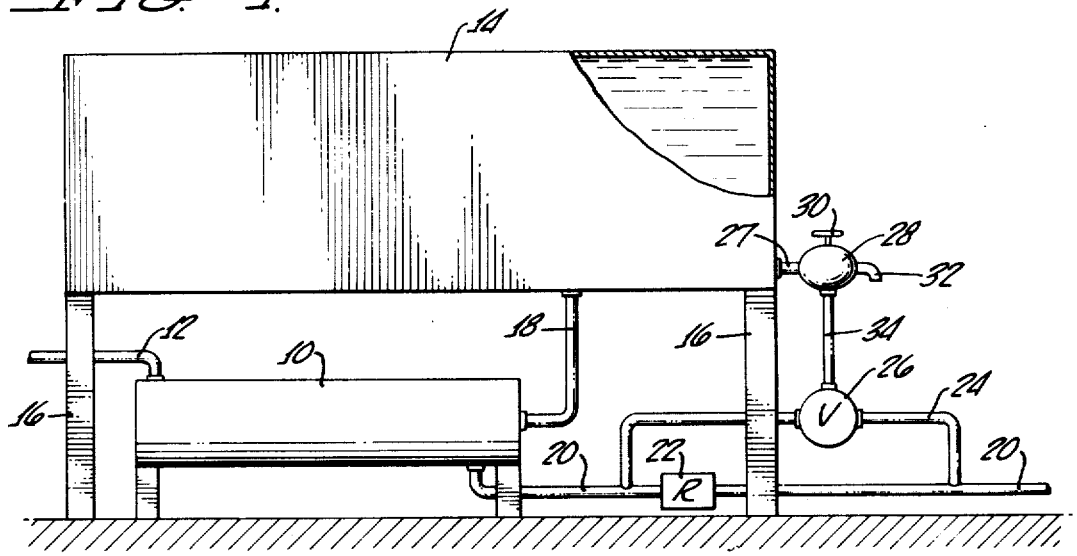
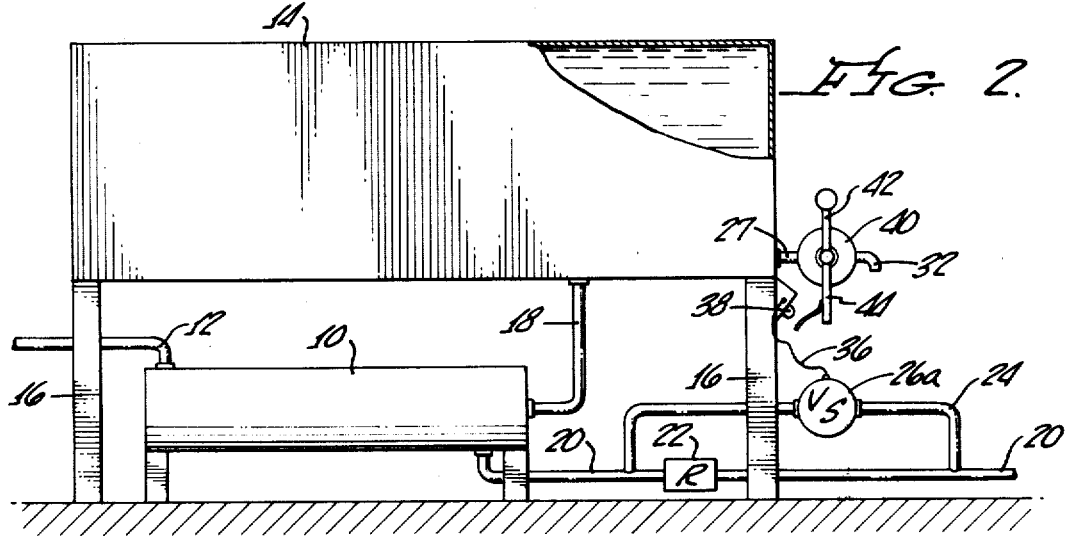
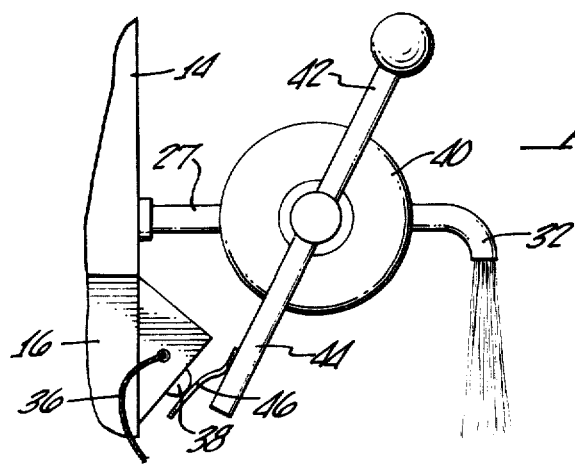

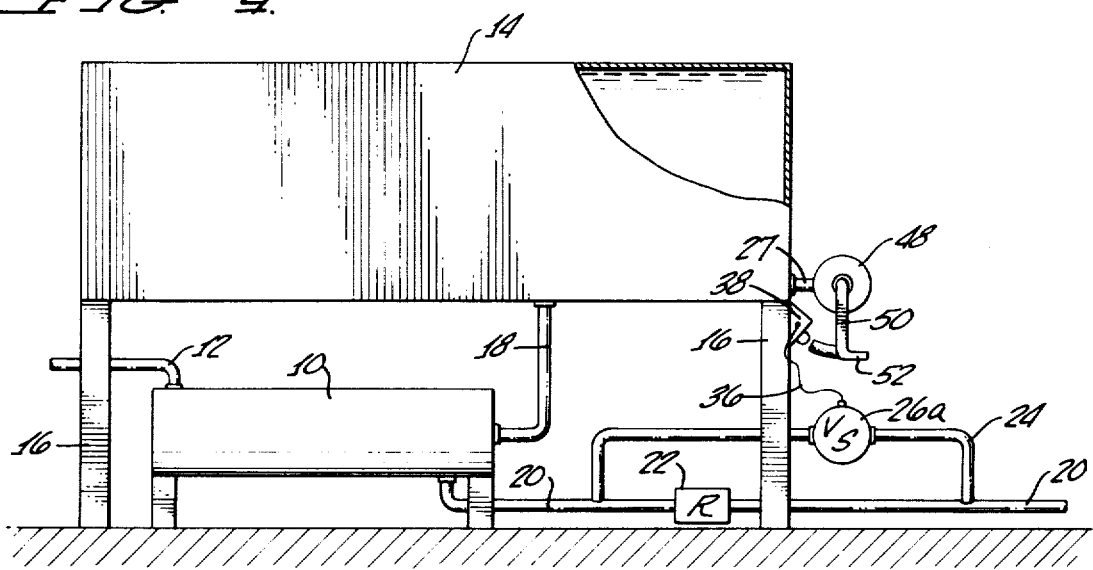
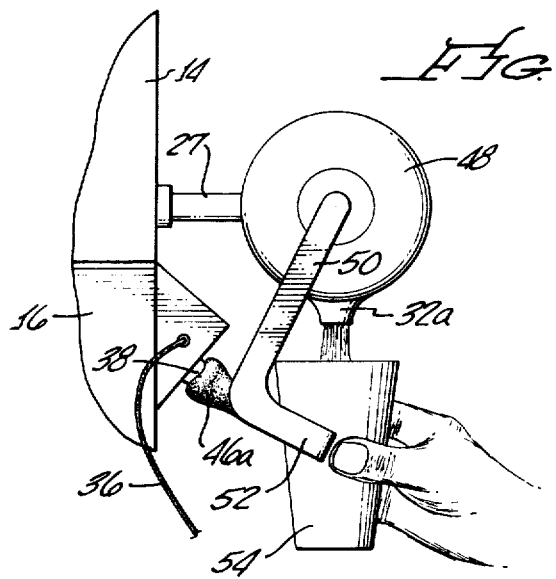

3,959,146

REVERSE OSMOSIS SYSTEM WITH AUTOMATIC FLUSHING

BACKGROUND OF THE INVENTION

1. The Field of the Invention

This invention relates to a reverse osmosis system for purifying water, and more particularly to such a system with provision for automatically flushing the membrane module.

2. The Prior Art

A number of reverse osmosis systems have been proposed or used which have included provisions for periodically flushing the membrane module. Flushing, using for example a temporarily unrestricted flow of feed water through the module, is effective to wash away salts and deposits which may have accumulated on the membrane surfaces. Flushing schedules may be automatic with suitable valves actuated by a timer, or may be manually accomplished after predetermined time intervals, or when membrane operating characteristics indicate the need.

Small household reverse osmosis units are valuable for producing a relatively small quantity of so-called "bottled water" quality water from a municipal supply. Such units must operate for long periods of time without service or attention and flushing procedures are helpful iin maintaining membrane efficiency. However, flushing equipment must be simple, automatic, reliable and inexpensive; sophisticated devices are unsuitable because of cost and complexity.

SUMMARY OF THE INVENTION

Summarized briefly, this invention comprises a reverse osmosis system for purifying water which comprises a module containing a semipermeable membrane, means for introducing feed water under elevated pressure into the module, means including a flow control device for releasing concentrate from the module while maintaining operating pressure therein, and a tank for temporarily storing purified water produced by the module. The storage tank is provided with means, such as a spigot, for dispensing purified water therefrom. A by-pass pipe is arranged around the flow control device in the concentrate release means. A valve, normally closed, is placed in the by-pass pipe and means are provided to automatically open this valve concomitantly with delivery of purified water from the storage tank. The feed water introduced into the module is thereby allowed to flow freely through the module and the by-pass pipe around the flow control device to flush and clean membrane surface, each time purified water is delivered from the tank dispensing means. The valve in the by-pass pipe is operatively connected electrically or mechanically to the storage tank dispensing means or spigot so that it opens and closes concomitantly therewith.

In an alternative embodiment, the valve in the by-pass pipe is opened and closed by a mechanical or electrical connection energized by positioning of a receptacle to actuate the dispensing means of the storage tank.

BRIEF DESCRIPTION OF THE DRAWINGS

FIG. 1 shows a side view, partly diagrammatic, of a reverse osmosis system embodying features of this invention.

FIG. 2 shows an alternative embodiment of the reverse osmosis system of this invention, in which a solenoid-operated by-pass valve is employed.

FIG. 3 shows, much enlarged, the dispensing valve of the embodiment of FIG. 2, in open or dispensing position.

FIG. 4 shows another alternative embodiment of the reverse osmosis system of this invention, in which a receptacle-actuated dispensing valve is employed.

FIG. 5 shows, much enlarged, the dispensing valve of the embodiment of FIG. 4, in open or dispensing position.

DESCRIPTION OF PREFERRED EMBODIMENTS

Referring now to FIG. 1, the reverse osmosis system comprises a membrane-containing module 10, which may be of a well known type, as for example described in U.S. Pat. Nos. 3,813,334 or 3,542,203, and which may enclose a so-called spiral wound semipermeable membrane cartridge. Feed water to be purified in module 10, such as from a municipal water supply and under elevated pressure of the order of 30–100 psi, is introduced thereinto through feed pipe 12. A purified water storage tank 14 is supported by legs 16 and into which is transferred through pipe 18, the purified water produced by module 10. The concentrate from module 10 is released through pipe 20 in which is placed a flow control device 22, which may be of the restricted orifice or long small diameter tube type or a back pressure control valve of conventional design or other device for releasing a controlled flow of concentrate from module 10 while retaining operating pressure therein. Around flow control 22, and connected on both sides as shown into concentrate release pipe 20, is by-pass pipe 24 in which is arranged valve 26. It will be clearly seen from the drawings that by-pass pipe 24 provides a direct, unrestricted connection between the concentrate outlet of module 10 and the outlet of the concentrate release means, that is the outlet end of pipe 20, when valve 26 is open. Arranged at or near the bottom of storage tank 14 and which may be connected thereto by short pipe 27, is dispensing means in the form of spigot 28 which can be opened and closed by turning handle 30 to deliver purified water from spout 32. By-pass valve 26 is normally closed and means for automatically opening and re-closing valve 26 concomitantly with delivery of purified water from spigot 28 comprise a mechanical link 34 connecting the opening and closing elements (which may be bored plugs) of spigot 28 and valve 26 so that as spigot 28 is opened and closed, by-pass valve 26 is also concomitantly opened and closed. Thus, when spigot 28 is opened for delivery of purified water from spout 32, link 34 also opens valve 26 to open by-pass pipe 24 around flow control 22. This results in unimpeded flow of feed water through module 10 and out concentrate release pipe 20 to provide an advantageous flushing action each time spigot 28 is opened for delivery of purified water. Flushing feed water through module 10, and the membrane cartridge contained therein, washes away sludge, slime and other deposits which may tend to coat the membrane surface and reduce membrane efficiency.

Referring now to FIGS. 2 and 3, an embodiment is illustrated in which a solenoid valve is employed in by-pass pipe 24 instead of the mechanically operated valve of the embodiment of FIG. 1. In FIG. 2, the module 10, feed pipe 12, storage tank 14, legs 16, purified water pipe 18, concentrate release pipe 20, flow control device 22, by-pass pipe 24 and tank valve connector pipe 27 are identical with similarly numbered elements in FIG. 1. The valve 26a in the by-pass pipe 24 is, however, of an electrically operated type, as by a solenoid, powered by conventional connection to a current supply (not shown) and opened and closed by connection 36 to micro switch 38, which is suitably mounted to one of legs 16 as shown. The means for dispensing purified water from storage tank are shown enlarged in FIG. 3 and comprise a valve 40 operated by handle 42 having a lower extension 44, which when valve 40 is opened by pulling the handle clockwise as shown in FIG. 3, contacts micro switch 38 preferably through a resilient member, such as flat spring 46. Solenoid valve 26a is, like valve 26 in FIG. 1, normally closed and is opened automatically by contact of member 46 of arm 44 on micro switch 38. When handle 42 is returned to vertical position to shut off water delivery from spout 32, as seen in FIG. 2, then member 46 of arm 44 is disengaged from micro switch 38 and solenoid valve 26a is again closed. Resilient member 46 is advantageous to contact micro switch 38 when valve 40 is only partially as well as fully opened. Thus, the flushing effect through module 10 is obtained while purified water is being delivered at a low as well as a high rate through spout 32.

Referring now to FIGS. 4 and 5, an embodiment is illustrated in which a solenoid valve is employed in the by-pass pipe around the flow control and is operated by a micro switch as in the embodiment of FIG. 2, but the micro switch is actuated by a receptacle positioned to actuate and open the valve comprising means for dispensing purified water from the storage tank. In FIG. 4, the module 10, feed pipe 12, storage tank 14, legs 16, purified water pipe 18, concentrate release pipe 20, flow control 22, by-pass pipe 24, valve 26a, tank valve connector pipe 27, electrical connector 36 and micro switch 38 are identical with similarly numbered elements in FIG. 2. Valve 48 is, however, different from valve 40 in FIG. 2, as will be seen more clearly in FIG. 5, and is of a type operated by lever 50 which is conventionally spring biased to normally be vertical, as in FIG. 4, and thus close valve 48, and has at its lower end spaced arms 52 adapted to receive a receptacle such as glass 54. When lever 50 is moved clockwise and positioned as shown in FIG. 5 to place glass 54 under delivery spout 32a, valve 48 is opened to provide delivery of purified water into glass 54 and at the same time resilient member 46a (in this case a pad or block of elastomeric material) contacts micro switch 38 to automatically also open valve 26a. Resilient pad 46a serves the same function as flat spring 46 in FIGS. 2 and 3, that is to trigger micro switch 38 even when only a small flow of purified water is being delivered from valve 48. When receptacle (glass) 54 is removed from between spaced arms 52, lever 50 returns to its normal vertical position as seen in FIG. 4, thus re-closing valve 48 and also disengaging resilient pad 46a from micro switch 38, thus automatically closing by-pass valve 26a.

In operation of the reverse osmosis system of this invention, the feed pipe 12 is supplied with a source of water it is desired to purify under elevated pressure of preferably 30 to 100 psi for purification of municipal water for home use; or may be under higher pressure for industrial use or for treating highly saline feed water. The system then operates to purify the feed water by passage through a membrane or membranes in module 10 and supplies purified water to storage tank 14. Concentrate (also often referred to as brine or blowdown) is released through pipe 20 controlled by flow control 22 to maintain operating pressure in module 10. Actuating of the means for dispensing purified water from tank 14 automatically opens the normally closed valve 26 or 26a in the flow control by-pass pipe 24. Opening this by-pass pipe periodically when the dispensing valve is opened provides an advantageous flushing of feed water directly through module 10, by-passing the restriction of flow control 22. The flushing of the module is automatic, occuring each time the purified water dispensing valve is opened.

For clarity and ease of understanding, storage tank 14 has been shown as a simple sealed container into which purified water will be transferred through pipe 18. As the pressure of purified water in tank 14 rises when the tank becomes filled, the operating pressure across the membrane will be reduced and production of purified water will be slowed or stopped. If desired, an overflow for tank 14 may be provided, or other means for module operation control may be included.

The automatic and periodic flushing of module 10 accomplished by this invention is useful to maintain the membrane surface or surfaces in module 10 clean, and to wash out and remove sludge, slime and other deposits from the membrane surfaces and other parts of the module interior by a temporary forceful flow or flush of feed water. The automatic control of flush periods by interconnection with the purified water dispensing valve provides extremely simple and reliable control. The interconnection may be electrical or mechanical, without need for sophisticated or complicated devices or timing mechanisms. The system of this invention provides flushing times and frequency related to the use of the purified water produced and withdrawn from the storage tank. This avoids arbitrary, time-based flushing controls which do not provide increased flushing during periods of greater module use measured by purified water withdrawal.

I claim:

1. A reverse osmosis system comprising a membrane-containing module, means for introducing feed water under elevated pressure into said module, means including a flow control device for releasing concentrate from said module while maintaining operating pressure therein, and a tank for temporarily storing purified water produced by said module, said tank having dispensing means for dispensing purified water therefrom; in which the improvement comprises:
 a. a by-pass pipe, having a normally closed valve therein, around said flow control device providing a direct, unrestricted connection between the concentrate outlet of said module and the outlet of said means for releasing said concentrate from said module; and
 b. means for automatically opening and closing said valve in said by-pass pipe to flush water through said module concomitantly with delivery of purified water from said dispensing means.

2. A reverse osmosis system according to claim 1, in which means for opening and closing said valve in said by-pass pipe include an operative connection to said dispensing means of said tank.

3. A reverse osmosis system according to claim 2, in which said valve in said by-pass pipe is mechanically connected to said dispensing means of said tank whereby said valve opens and closes concomitantly with said dispensing means.

4. A reverse osmosis system according to claim 2, in which said valve in said by-pass pipe is electrically connected to said dispensing means of said tank whereby said valve opens and closes concomitantly with said dispensing means.

5. A reverse osmosis system according to claim 4, in which the said valve in said by-pass pipe is a solenoid valve electrically connected to a micro switch which is actuated by an arm connected to the handle of said dispensing means.

6. A reverse osmosis system according to claim 5, in which a resilient member is attached to said arm connected to said handle of said dispensing means, said resilient member being arranged to contact and actuate said micro switch when said handle of said dispensing means is in partially, as well as fully, opened position.

7. A reverse osmosis system according to claim 1, in which said means for opening and closing said valve are actuated by a receptacle positioned to accept delivery of purified water from the dispensing means of said tank.

8. A reverse osmosis system according to claim 7, in which said valve is solenoid operated, said solenoid being energized by a switch actuated by a receptacle positioned to accept delivery of purified water from said dispensing means.

* * * * *